US009866125B2

(12) United States Patent
Wang et al.

(10) Patent No.: US 9,866,125 B2
(45) Date of Patent: Jan. 9, 2018

(54) INPUT VOLTAGE SENSOR RESPONSIVE TO LOAD CONDITIONS

(71) Applicant: Power Integrations, Inc., San Jose, CA (US)

(72) Inventors: Zhao-Jun Wang, San Jose, CA (US); Giao Minh Pham, Milpitas, CA (US); Roland Sylvere Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/189,285

(22) Filed: Jun. 22, 2016

(65) Prior Publication Data

US 2016/0308451 A1    Oct. 20, 2016

Related U.S. Application Data

(63) Continuation of application No. 13/801,980, filed on Mar. 13, 2013, now Pat. No. 9,401,657.

(51) Int. Cl.
*H02M 3/335* (2006.01)
*H02M 1/32* (2007.01)
(Continued)

(52) U.S. Cl.
CPC ......... *H02M 3/33515* (2013.01); *H02M 1/08* (2013.01); *H02M 1/32* (2013.01);
(Continued)

(58) Field of Classification Search
CPC ...... H02M 7/12; H02M 1/32; H02M 3/33523; H02M 2001/0032; H02M 7/06
See application file for complete search history.

(56) References Cited

U.S. PATENT DOCUMENTS 5,162,970 A    11/1992   Davis, Jr. et al.
5,650,357 A    7/1997    Dobkin et al.
(Continued)

FOREIGN PATENT DOCUMENTS

EP    2355316 A1    8/2011
JP    H09-260569    10/1997

OTHER PUBLICATIONS

SEN012-013, SENZero Family: "Zero1 Loss High Voltage Sense Signal Disconnect IC", Rev. B, Nov. 5, 2010, www.power.com, 8 pages, Power Integrations.

(Continued)

*Primary Examiner* — Gary L Laxton
*Assistant Examiner* — Peter Novak
(74) *Attorney, Agent, or Firm* — Christensen O'Connor Johnson Kindness PLLC (57) ABSTRACT

An ac-dc power converter controller includes a switch driver circuit coupled to generate a drive signal to control switching of a power switch to control a transfer of energy from an input of the power converter to an output of the power converter. An input sense circuit is coupled to receive an input sense signal representative of the input of a power converter. A sense enable circuit is coupled to generate a sense enable signal in response to the drive signal. The sense enable signal is coupled to control the input sense circuit to sense the input sense signal for an extended duration of time after the power switch turns OFF.

24 Claims, 9 Drawing Sheets

(51) Int. Cl.
  *H02M 7/12*   (2006.01)
  *H02M 1/08*   (2006.01)
  *H02M 7/06*   (2006.01)
  *H02M 1/00*   (2006.01)
(52) U.S. Cl.
  CPC ......... *H02M 3/33523* (2013.01); *H02M 7/12* (2013.01); *H02M 7/06* (2013.01); *H02M 2001/0009* (2013.01); *H02M 2001/0032* (2013.01); *Y02B 70/16* (2013.01)

(56) References Cited

U.S. PATENT DOCUMENTS

| | | | |
|---|---|---|---|
| 5,729,120 | A | 3/1998 | Stich et al. |
| 6,078,510 | A * | 6/2000 | Spampinato ...... H02M 3/33523 363/19 |
| 6,147,883 | A | 11/2000 | Balakrishnan et al. |
| 6,384,478 | B1 | 5/2002 | Pour |
| 6,998,952 | B2 | 2/2006 | Zhou et al. |
| 7,257,008 | B2 | 8/2007 | Yang et al. |
| 7,468,547 | B2 | 12/2008 | Harvey |
| 7,524,731 | B2 | 4/2009 | Wang |
| 7,619,297 | B2 | 11/2009 | Wang |
| 7,868,431 | B2 | 1/2011 | Feng et al. |
| 7,884,696 | B2 | 2/2011 | Hébert et al. |
| 8,077,484 | B2 | 12/2011 | Djenguerian et al. |
| 8,093,983 | B2 | 1/2012 | Fouquet et al. |
| 8,310,850 | B2 | 11/2012 | Polivka |
| 8,772,909 | B1 | 7/2014 | Vinciarelli |
| 9,134,744 | B2 | 9/2015 | Nork |
| 2004/0214376 | A1 | 10/2004 | Gibson et al. |
| 2005/0270807 | A1 | 12/2005 | Strijker |
| 2005/0271148 | A1 | 12/2005 | Dupuis |
| 2006/0245219 | A1* | 11/2006 | Li ........................... G05F 1/565 363/89 |
| 2008/0191648 | A1 | 8/2008 | Ito et al. |
| 2008/0232018 | A1 | 9/2008 | Yang et al. |
| 2009/0195505 | A1 | 8/2009 | Chen et al. |
| 2010/0014334 | A1 | 1/2010 | Katou et al. |
| 2011/0279101 | A1 | 11/2011 | Sasaki et al. |
| 2011/0317322 | A1 | 12/2011 | Chien et al. |
| 2014/0001977 | A1* | 1/2014 | Zacharchuk ........ H04L 12/2816 315/291 |
| 2014/0268938 | A1 | 9/2014 | Matthews et al. |
| 2014/0268951 | A1 | 9/2014 | Wang et al. |

OTHER PUBLICATIONS

SEN012-013, SENZero Family: "Zero1 Loss High Voltage Sense Signal Disconnect IC", Rev. C, May 15, 2015, www.power.com, 8 pages, Power Integrations.
EP Application No. 14158498.7—European Search Report, dated Jan. 23, 2015 (3 pages).
EP Application No. 14158499.5—European Search Report, dated Jan. 23, 2015 (3 pages).
EP Application No. 14158498.7—European Office Action, dated Feb. 5, 2015 (5 pages).
EP Application No. 14158499.5—European Office Action, dated Feb. 5, 2015 (6 pages).
EP Application No. 14158498.7—European Office Action, dated Dec. 7, 2016 (6 pages).
First Chinese Office Action and Translation, dated Jun. 29, 2017, for Chinese Application No. 201410090662.2, 10 pages.

* cited by examiner

INPUT VOLTAGE SENSOR RESPONSIVE TO LOAD CONDITIONS

CROSS-REFERENCE TO RELATED APPLICATIONS

This application is a continuation of U.S. patent application Ser. No. 13/801,980, filed on Mar. 13, 2013, now pending. U.S. patent application Ser. No. 13/801,980 is hereby incorporated by reference.

BACKGROUND INFORMATION

Field of the Disclosure

The present invention is related to power converters. More specifically, the present invention is related to power converters that operate with high efficiency at light loads.

Background

Controllers for off-line power converters often must measure the input voltage to perform functions such as under-voltage detection and over-voltage protection. Off-line power converters typically receive an input voltage that is greater than 100 volts ac. Since the ac voltage varies periodically between a peak positive value and a peak negative value at the frequency of the power line, the ac line voltage is typically represented numerically as a root mean square (rms) value of a sine wave. The rms value of the ac voltage is the magnitude of the peak voltage divided by the square root of two. For example, in the United States the common household voltage is 120 volts ac with a peak value of 169.7 volts. In many other parts of the world, the common household voltage is 240 volts ac with a peak value of 339.4 volts. The ac rms voltage is equivalent to a dc voltage of the same numeric value when both are applied to the same resistive load such as an incandescent lamp. Transient disturbances and faults on the power line can momentarily raise the voltage to substantially higher values.

Off-line power converters typically rectify the ac input voltage to obtain an unregulated dc input voltage that is then converted to a lower regulated dc voltage. The maximum value of the unregulated dc input voltage is approximately the peak value of the ac input voltage. Semiconductor components in the power converter may need to withstand voltages that are substantially greater than the peak of the ac input voltage when the converter is operating. Therefore, it is necessary for controllers of power converters to measure the input voltage so that the components may be protected from damage due to excessively high voltage. A controller may halt operation of the converter to prevent damage when the input voltage goes higher than a threshold value.

Circuits that measure an input voltage typically do so by using a potential divider across the input to provide a known fraction of the input voltage that is low enough for the measurement circuit to handle. In order to reduce power consumption, the components of the divider are selected to take no more current from the input than necessary. To reduce power consumption further and to reduce the number of components, a current that represents the input voltage can be used instead of a potential divider. However, the current needs to be large enough to guarantee a reliable measurement in the presence of noise. The power taken from the source of input voltage is proportional to the product of the voltage and the current. Since the peak value of the ac input may be hundreds of volts, even the smallest current acceptable for reliable measurement can still result in a significant loss of power, especially when the power converter has a light load or no load. Power converters need a controller that can sense the input voltage reliably with low power consumption.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
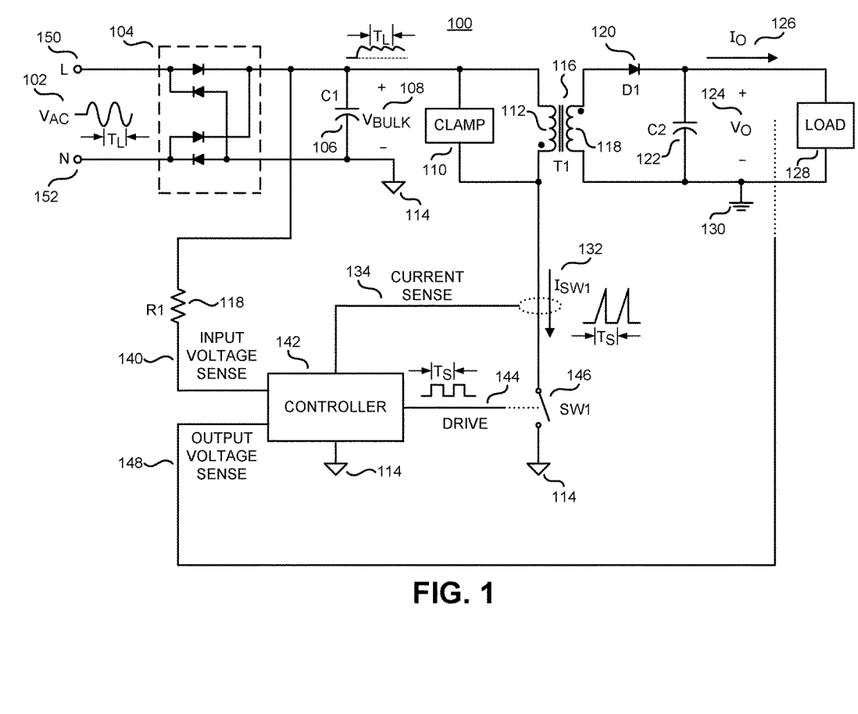
FIG. 1 is a schematic diagram of an example power converter including a controller that senses an input voltage in accordance with the teachings of the present invention.

The schematic diagram of FIG. 1 shows the salient features of one example of an ac-dc power converter 100 (ac input, dc output) receiving an ac input voltage $V_{AC}$ 102 that has a substantially sinusoidal waveform with a period $T_L$. The ac line period $T_L$ is the reciprocal of the ac line frequency. The standard ac line frequency is nominally either 50 hertz or 60 hertz, depending on the country and location of the power system. Power converters designed for worldwide operation typically accept ac line frequencies between 47 hertz and 63 hertz, corresponding to ac line periods between approximately 21 milliseconds and 16 milliseconds, respectively. A controller 142 in the example power converter of FIG. 1 includes an input voltage sensor in accordance with the teaching of the present invention. The example ac-dc power converter of FIG. 1 provides a substantially dc output voltage $V_O$ 124 and a substantially dc output current $I_O$ 126 to a load 128.

The example power converter of FIG. 1 is known as a flyback power converter because of its particular circuit topology. A power converter that is controlled to produce a regulated output is sometimes called a regulated power supply. A flyback converter that produces a regulated output is sometimes called a flyback power supply. Those skilled in the art will appreciate that examples in accordance with the teachings of the present invention described in this disclosure is not limited to power converters that use a particular circuit topology, and that any type of power converter that operates from either an ac input voltage or from a dc input voltage may benefit from examples in accordance with the teachings of the invention.

In the example power converter of FIG. 1, a full-wave bridge rectifier 104 receives ac input voltage $V_{AC}$ 102 between line input terminal L 150 and neutral input terminal N 152 to produce a dc voltage $V_{BULK}$ 108 on an input capacitor C1 106. Dc voltage $V_{BULK}$ 108 is positive with respect to an input return 114, and has a time varying component at twice the frequency (half the period) of the ac line due to energy being removed from the capacitor by the power converter between peaks of the line voltage waveform 102. The maximum value of the bulk voltage $V_{BULK}$ 108 is approximately the peak magnitude of the ac input voltage $V_{AC}$ 102. The peaks of rectified voltage $V_{BULK}$ 108 in the example of FIG. 1 are coincident with the positive and negative peaks of the ac input voltage $V_{AC}$ 102. The minimum value of the bulk voltage $V_{BULK}$ 108 is substantially greater than zero when the ac input voltage $V_{AC}$ 102 is present.

The dc voltage $V_{BULK}$ 108 in the example of FIG. 1 is coupled to a coupled inductor T1 116 that is sometimes referred to as a transformer. Coupled inductor T1 116 is an energy transfer element in the example power converter of FIG. 1. Coupled inductor T1 116 includes a primary winding 112 and a secondary winding 118. Primary winding 112 is sometimes referred to as an input winding, and secondary winding 118 is sometimes referred to as an output winding. In the example of FIG. 1, one end of secondary winding 118 is coupled to an output return 130. In other examples, coupled inductor T1 116 may have additional windings coupled to the output return 130, and additional windings coupled to the input return 114. The additional windings coupled to the output return 130 are sometimes referred to as output windings. Additional windings coupled to the input return 114 are sometimes referred to as bias windings, auxiliary windings, or primary sensing windings.

One end of primary winding 112 receives the dc voltage $V_{BULK}$ 108 in the example of FIG. 1. The other end of primary winding 112 is coupled to a switch SW1 146 that opens and closes in response to a drive signal from a controller 142. A clamp circuit 110 is coupled across the ends of primary winding 112 to protect the switch SW1 146 from excessive voltage that may result from the switching of switch SW1 146.

In a practical power converter, switch SW1 146 is typically a semiconductor device such as for example a transistor that is controlled by a drive signal to be either open or closed. A switch that is open cannot conduct current. A switch that is closed may conduct current.

In the example of FIG. 1, switch SW1 146 receives a drive signal from a drive signal terminal 144 of controller 142. The drive signal changes periodically between a high value and low value with period $T_S$ that is the switching period. The switching period $T_S$ is much less than the ac line period $T_L$. The switching period $T_S$ is the reciprocal of the switching frequency. In one example, the switching period $T_S$ is about 15 microseconds or less when the power converter is providing maximum output power to load 128, whereas the ac line period $T_L$ is about 20 milliseconds. In other words, the ac line period $T_L$ is typically more than 1000 times greater than the switching period $T_S$, so that there can be typically more than 1000 switching periods within one ac line period.

In the example power converter of FIG. 1, the switching of switch SW1 146 produces pulsating currents in the primary winding 112 and in the secondary winding 118 of coupled inductor T1 116. Current from secondary winding 118 is rectified by diode D1 120 and filtered by an output capacitor C2 122 to produce an output voltage $V_O$ 124 and an output current $I_O$ 126. In the example of FIG. 1, output voltage $V_O$ 124 is positive with respect to an output return 130.

In the example of FIG. 1, the input return 114 is galvanically isolated from the output return 130. Galvanic isolation prevents dc current between input and output of the power converter. In other words, a dc voltage applied between an input terminal and an output terminal of a power converter with galvanic isolation will produce substantially no dc current between the input terminal and the output terminal of the power converter. It is appreciated that in other examples, power converters without galvanic isolation may be used depending on system isolation requirements and would still benefit from the teachings of the present invention.

In the example of FIG. 1, controller 142 receives an input voltage sense signal at an input voltage sense terminal 140, an output voltage sense signal at an output voltage sense terminal 148, and a current sense signal at a current sense terminal 134 for the regulation of output voltage $V_O$ 124. The voltages of controller 142 are referenced to the input return 114. In various examples, the output voltage sense signal received at output voltage sense terminal 148 may be galvanically isolated from the output return 130 by the use of an optocoupler, or for example by the use of a winding on a transformer, or for example by the use of magnetically coupled conductors that are part of a leadframe of an integrated circuit package, or for example by the use of special high voltage safety capacitors.

A variety of different techniques may be utilized to sense the switch current $I_{SW1}$ 132 for the current sense signal at the current sense terminal 134. For example, the switch current $I_{SW1}$ 132 may be sensed as a voltage on a discrete resistor, or as a current from a current transformer, or as a voltage across the on-resistance of a metal oxide semiconductor field effect transistor (MOSFET) or as a current from the sense output of a current sensing field effect transistor (senseFET).

In the example of FIG. 1, the ac input voltage $V_{AC}$ 102 is sensed as the dc voltage $V_{BULK}$ 108 on capacitor C1 106. The dc input voltage $V_{BULK}$ 108 is coupled to an input sensing resistor R1 118 before it is received at the input voltage sense terminal 140 of controller 142. Current in resistor R1 returns to the ac input through the bridge rectifier 104.

Figure 2:
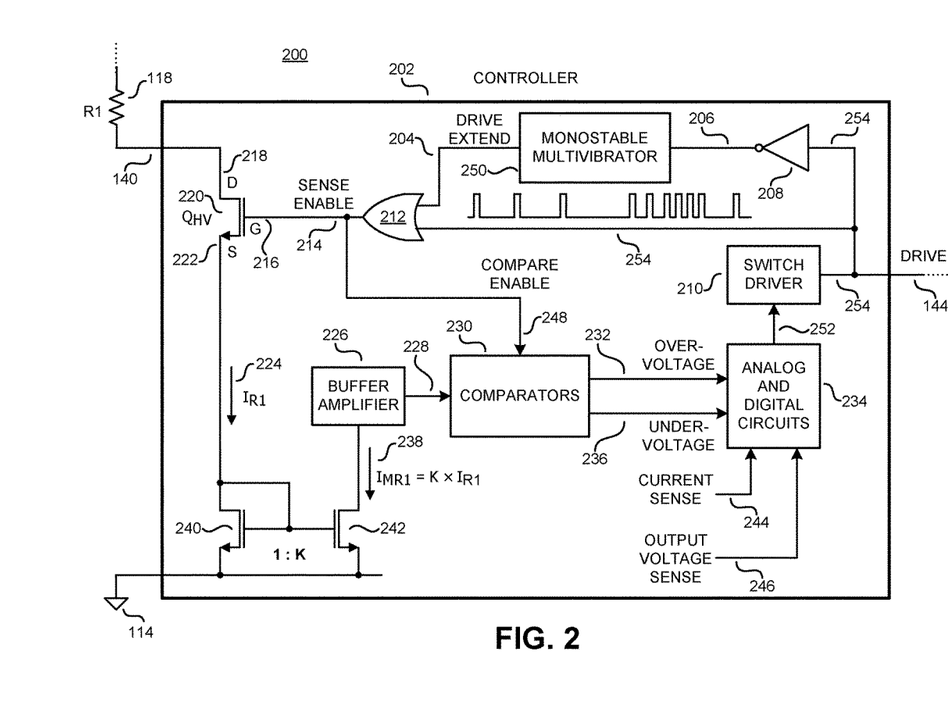
FIG. 2 is a functional block diagram of an example power converter controller illustrating elements of a load-selective input voltage sensor in accordance with the teachings of the present invention.

FIG. 2 is a functional block diagram 200 of an example controller 202 for the example power converter of FIG. 1 illustrating elements of an input voltage sensor in accordance with the teachings of the present invention. In the example of FIG. 2, controller 202 is an integrated circuit that includes a buffer amplifier 226, comparators 230, an OR gate 212, a high voltage transistor $Q_{HV}$ 220, a current mirror formed by transistors 240 and 242, a monostable multivibrator 250 (also known as a one-shot and a single shot), a logic inverter 208, a switch driver 210, with various analog and digital circuits 234. In one example, buffer amplifier 226, high voltage transistor $Q_{HV}$ 220, and the current mirror formed by transistors 240 and 242 may be considered as being part of an input sense circuit included in controller 202. In one example, OR gate 212, monostable multivibrator 250 and logic inverter 208 may be considered as being part of a sense enable circuit included in controller 202.

The various analog and digital circuits 234 typically include an oscillator (not shown in FIG. 1) that provides signals available to all circuits in controller 202 for synchronization and timing. In some controllers, signals for synchronization and timing may be received from any suitable marker of time instead of an oscillator, such as for example a system clock.

It will be appreciated by those skilled in the art that a power converter controller need not be entirely within an integrated circuit. For example, high voltage transistor $Q_{HV}$ 220 may be a discrete transistor outside an integrated circuit, and other elements of the controller may be included in one or more integrated circuits.

In the example of FIG. 2, controller 202 receives an input voltage sense signal at an input voltage sense terminal 140 that is coupled to one end of a voltage sensing resistor R1 118. The other end of the voltage sensing resistor R1 118 may be coupled to a rectified ac input voltage, for example $V_{BULK}$ 108 shown in the example of FIG. 1. The input voltage sense terminal 140 of the example controller 202 in FIG. 2 is a high voltage terminal with respect to the input return 114. A high voltage terminal of an integrated circuit is generally one that is adapted to withstand more than 30 volts with respect to the ground terminal without damage or disruption to the operation of the integrated circuit. In the example of FIG. 2, the voltage at the input voltage sense terminal 140 may be as high as the peak of the rectified voltage $V_{BULK}$ 108 that may exceed several hundred volts.

In the example of FIG. 2, the input voltage sense terminal 140 is coupled to the drain D 218 of a high voltage transistor $Q_{HV}$ 220. In one example, high voltage transistor $Q_{HV}$ 220 is an n-channel enhancement mode metal oxide semiconductor field effect transistor (MOSFET). In the example of FIG. 2 high voltage transistor $Q_{HV}$ 220 has a gate G 216 coupled to the output of an OR gate 212, and a source S 222 coupled to the drain and gate of a low voltage MOSFET 240.

When high voltage transistor $Q_{HV}$ 220 is in an ON state it may conduct current between drain and source. When high voltage transistor $Q_{HV}$ 220 is in an OFF state it cannot conduct current. A transistor in an ON state may be considered to be a switch that is closed. A transistor in an OFF state may be considered to be a switch that is open. High voltage transistor $Q_{HV}$ 220 is in an ON state when the voltage at the gate G 216 is greater than the voltage at the source S 222 by more than a threshold voltage $V_T$. Conversely, high voltage transistor $Q_{HV}$ 220 is in an OFF state when the voltage at the gate G 216 is not greater than the voltage at the source S 222 by more than a threshold voltage $V_T$. A transistor in an ON state is sometimes referred to as being ON. A transistor in an OFF state is sometimes referred to as being OFF.

In one example, the threshold voltage $V_T$ of high voltage transistor $Q_{HV}$ 220 is typically 2.5 volts. In one example, the output of OR gate 212 is approximately 5.8 volts at a logic high level and the output of OR gate 212 is substantially zero volts at a logic low level. In other words, high voltage transistor $Q_{HV}$ 212 may conduct current when the output of OR gate 212 is at a high logic level, and the high voltage transistor $Q_{HV}$ 220 cannot conduct current when the output of OR gate 212 is at a logic low level.

The output of OR gate 212 in the example of FIG. 2 determines when high voltage transistor $Q_{HV}$ 220 is ON and when high voltage transistor $Q_{HV}$ 220 is OFF. When high voltage transistor $Q_{HV}$ 220 in the example controller of FIG. 2 is ON, the input sense circuit is enabled as the input voltage sense terminal 140 may receive current $I_{R1}$ 224 from the input through input sensing resistor R1 118. When high voltage transistor $Q_{HV}$ 220 is OFF, the input sense circuit is disabled input voltage sense terminal 140 receives substantially no current from the input. In other words, controller 202 in the example of FIG. 2 is enabled to sense the input voltage only when high voltage transistor $Q_{HV}$ 220 is ON. Controller 202 in the example of FIG. 2 reduces the power consumed in sensing the input voltage to the power converter 100 by limiting the times when input voltage sense terminal 140 receives current from the input to the power converter in accordance with the teachings of the present invention.

High voltage transistor $Q_{HV}$ 220 in the example of FIG. 2 may be considered an input voltage sense switch that closes to enable sensing of the input voltage, and that opens to disable sensing of the input voltage and prevent power consumption from the sensing of the input voltage in accordance with the teachings of the present invention.

When high voltage transistor $Q_{HV}$ 220 in the example controller of FIG. 2 is ON, a current $I_{R1}$ 224 that is representative of the input voltage may enter the drain of transistor 240. Transistors 240 and 242 form a current mirror with a ratio K that scales the current $I_{R1}$ 224 in the drain of transistor 240 to a mirrored current $I_{MR1}$ 238 that is $I_{R1}$ multiplied by K in the drain of transistor 242. As shown in the depicted example, mirrored current $I_{MR1}$ is processed by a buffer amplifier 226, which is coupled to produce a buffered sense signal 228. Buffer amplifier 226 in the example of FIG. 2 may provide amplification, level shifting, current-to-voltage conversion, and any other transformation known in the art as needed to make the buffered sense signal 228 compatible with the circuits that receive it, such as for example comparators 230.

In the example controller 202 of FIG. 2, comparators 230 receive the buffered sense signal 228 that is responsive to the input voltage of the power converter. Buffered sense signal 228 is compared to threshold values that correspond to the range of input voltage specified for the power converter to operate. When enabled by a logic high level of SENSE ENABLE signal 214 at a COMPARE ENABLE input 248, the comparators 230 assert either an over-voltage signal 232 or an under-voltage signal 236 if the input voltage is outside the specified range for operation. In the example of FIG. 2, the SENSE ENABLE signal 214 is at a logic low level when the voltage sense circuit is disabled from sensing the input voltage to prevent the assertion of a false under-voltage signal.

In the example controller 202 of FIG. 2, analog and digital circuits 234 receive and process control sense signals as required to regulate the output of the power converter. CURRENT SENSE signal 244, OUTPUT VOLTAGE SENSE signal 246, OVER-VOLTAGE signal 232 and UNDER-VOLTAGE signal 236 are processed to produce a command signal 252 that is received by a switch driver circuit 210. Switch driver circuit 210 produces a DRIVE signal 254 at drive terminal 144. DRIVE signal 254 goes to a logic high level to close switch SW1 146. DRIVE signal 254 goes to a logic low level to open switch SW1 146. A timing diagram is presented later in this disclosure to illustrate the relationships among various signals in the example controller of FIG. 2.

Monostable multivibrator 250 in the example of FIG. 2 receives an inverted drive signal 206 from inverter 208 to produce a DRIVE EXTEND signal 204 that is received at a first input of OR gate 212. In the example of FIG. 2, DRIVE EXTEND signal 204 goes to logic high level when DRIVE signal 254 goes to a logic low level. A second input of input of OR gate 212 receives the DRIVE signal 254 to produce a SENSE ENABLE signal 214 that is received at the gate G 216 of high voltage transistor $Q_{HV}$ 220. High voltage transistor $Q_{HV}$ 220 is ON when an input of OR gate 212 is at a logic high level.

Figure 3:
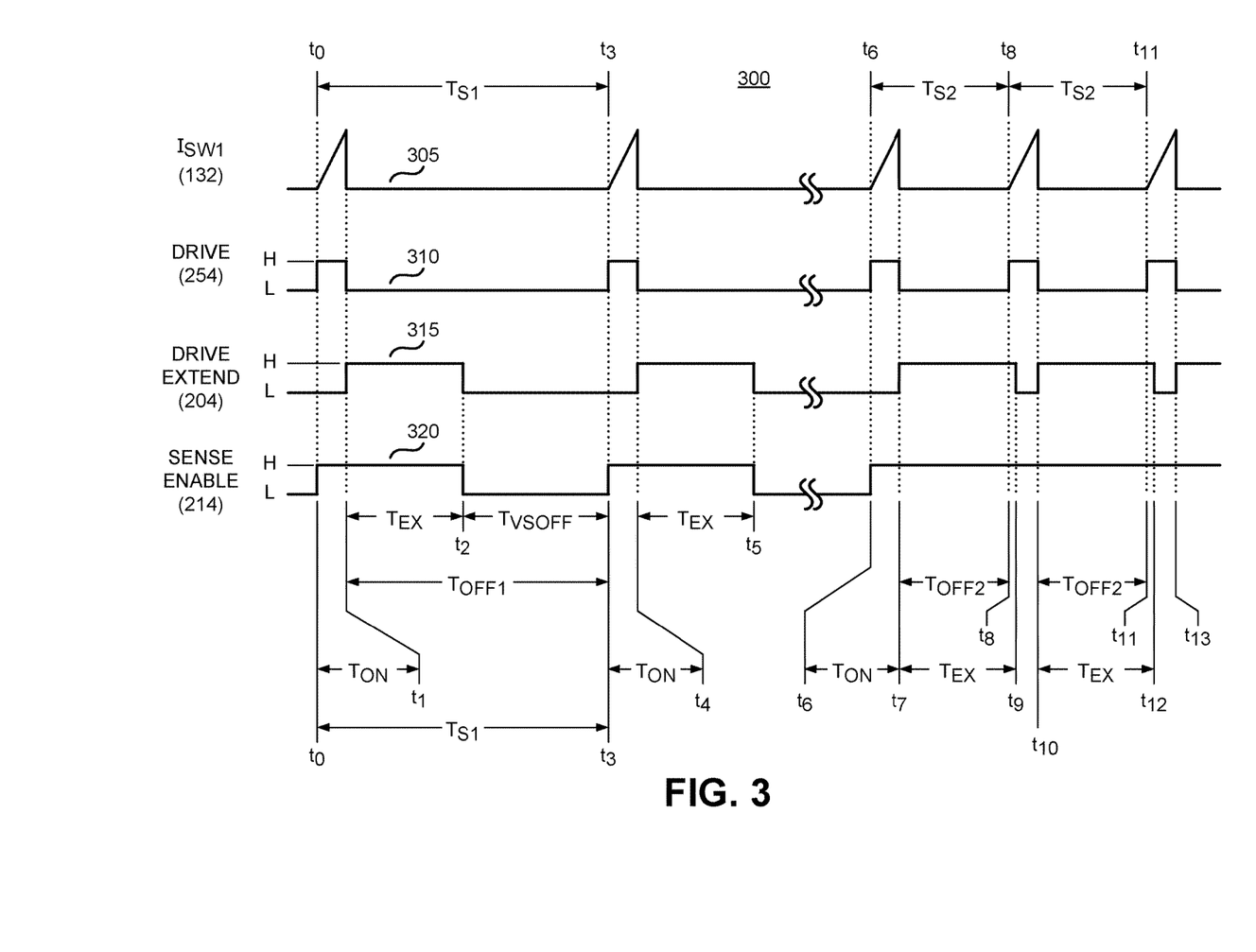
FIG. 3 is a timing diagram showing example waveforms that illustrate the operation of the example load-selective input voltage sensor shown in FIG. 2 in accordance with the teachings of the present invention.

FIG. 3 is a timing diagram 300 that shows example waveforms illustrating the operation of the example input voltage sensor shown in FIG. 2 as used in the example power converter of FIG. 1. The example waveforms of FIG. 3 are for steady-state conditions after transient disturbances from the application of ac input voltage $V_{AC}$ 102 have decayed to negligible values.

Waveform 305 in the example of FIG. 3 represents the current $I_{SW1}$ 132 in the switch SW1 146 of the example power converter of FIG. 1. Current $I_{SW1}$ 132 increases linearly while switch SW1 146 is ON in the example power converter of FIG. 1, and current $I_{SW1}$ is substantially zero when switch SW1 146 is OFF.

Waveform 310 in the example of FIG. 3 represents DRIVE signal 254 in the example controller of FIG. 2 that drives switch SW1 146 in the example power converter of FIG. 1. The waveforms of FIG. 3 show that switch SW1 146 is ON when DRIVE signal 254 is at a logic high level, and switch SW1 146 is OFF when DRIVE signal 254 is at a logic low level.

Waveform 315 in the example of FIG. 3 represents the DRIVE EXTEND signal 204 in the example controller of FIG. 2. Waveform 320 in the example of FIG. 3 represents the SENSE ENABLE signal 214 in the example controller of FIG. 2. Since the SENSE ENABLE signal 214 is the output of an OR gate 212 that receives DRIVE signal 254 with DRIVE EXTEND signal 204, the SENSE ENABLE signal 214 is at a logic high level when either DRIVE EXTEND signal 204 or SENSE ENABLE signal 214 is at a logic high level.

The timing diagram 300 of FIG. 3 shows waveforms of signals from the example power converter 100 of FIG. 1 that uses the example controller 200 of FIG. 2 for the condition of a light load (low output current) before time $t_6$ and for the condition of a moderate to heavy load (higher output current) after time $t_6$. For the condition of a light load on the power converter, the switching period is $T_{S1}$ as indicated by the separation between times $t_0$ and $t_3$ that mark the times when the switch SW1 146 turns ON. Similarly for the condition of a moderate to heavy load, the switching period is $T_{S2}$ as indicated by the separation between times $t_6$ and $t_8$, and the separation between times $t_8$ and $t_{11}$.

The timing diagram of FIG. 3 illustrates that the switching period $T_{S1}$ for a light load is generally substantially greater than the switching period $T_{S2}$ for a moderate to heavy load in the example power converter of FIG. 1. It is a common practice in the design of controllers for power converters to increase the switching period (reduce the switching frequency) under conditions of light loading to reduce losses attributed to switching events, particularly for power converters that must operate with high efficiency at light loads. A switching period greater than a threshold value may therefore indicate the presence of a light load and the need to sense the input voltage with reduced power consumption.

In the example of FIG. 3, switch SW1 146 is ON for the duration $T_{ON}$ between times $t_0$ and $t_1$, between times $t_3$ and $t_4$, between times $t_6$ and $t_7$, between times $t_8$ and $t_{10}$, and between times $t_{11}$ and $t_{13}$. To avoid unnecessary complexity in the illustration, FIG. 3 shows the duration that the switch SW1 146 is ON is the same in each switching period for the condition of light load and for the condition of moderate to heavy load, indicating that the input voltage is the same for both conditions in the example of FIG. 3. The input voltage to the power converter and the duration $T_{ON}$ that the switch SW1 146 remains ON may be different in each switching period. In one example, the duration $T_{ON}$ that the switch SW1 146 remains ON is approximately 7 microseconds.

As shown in the example timing diagram of FIG. 3, the switching period is the sum of an on-time and an off-time of switch SW1 146. For the light load condition, the off-time is $T_{OFF1}$ between times $t_1$ and $t_3$. For the moderate to heavy load condition, the off-time is $T_{OFF2}$ between times $t_7$ and $t_8$, and between times $t_{10}$ and $t_{11}$.

The example of FIG. 3 shows that a high to low transition of the DRIVE signal 254 initiates a low to high transition of the DRIVE EXTEND signal 204 from the monostable multivibrator 250. The DRIVE EXTEND signal 204 remains at a logic high level for an extended duration $T_{EX}$ after switch SW1 146 turns OFF, as shown in the timing diagram between times $t_1$ and $t_2$, between times $t_4$ and $t_5$, between times $t_7$ and $t_9$, and between times $t_{10}$ and $t_{12}$. The design of monostable multivibrator 250 sets the extended duration $T_{EX}$.

The timing diagram of FIG. 3 shows that the SENSE ENABLE signal 214 is at a logic high level when the DRIVE signal 254 signal is at a logic high level. Therefore, the controller senses the input voltage whenever the switch SW1 146 is conducting. After the switch SW1 146 turns OFF, the DRIVE EXTEND signal 204 keeps the SENSE ENABLE signal 214 at a logic high level, allowing the controller to continue sensing the input voltage for the extended duration $T_{EX}$ after the switch SW1 146 turns OFF. If the off-time of the switch SW1 146 exceeds $T_{EX}$, then the SENSE ENABLE signal 214 goes to a logic low level that prevents the controller from sensing the input voltage, reducing the power consumed by the input sense circuit. The timing diagram of FIG. 3 shows that the controller does not sense the input voltage during the time $T_{VSOFF}$ between times $t_2$ and $t_3$.

If the off-time of switch SW1 146 is less than the extended duration $T_{EX}$, then the SENSE ENABLE signal 214 remains high for the entire switching period as illustrated after time $t_6$, and the controller senses the input voltage continuously without interruption. In other words, the controller senses the input voltage continuously when the load on the power converter is moderate to heavy, but the controller senses the input voltage only during a fraction of a switching period when the load on the power converter is light.

At moderate to heavy loads, the power consumed by sensing the input voltage is negligible in comparison to other losses in the power converter. At light loads where the power consumed by sensing the input voltage is a significant part of the total loss in the power converter, the input voltage is sensed for only a fraction of the switching period. The voltage on the switch SW1 is highest when the switch makes the transition from ON to OFF. At any given input voltage, the voltage that appears on the switch SW1 146 when the switch turns off at moderate to heavy loads is higher than the voltage that appears on the switch SW1 146 when the switch turns off at light loads. Therefore, at light loads the converter is less likely to be damaged from an excessive input voltage, and the risk is relatively low that the input voltage will get high enough to damage the converter between sensing events. At moderate to heavy loads, however, it is important to sense the input voltage continuously so that the controller may prevent the switch from turning ON when the input voltage is too high.

Figure 4:
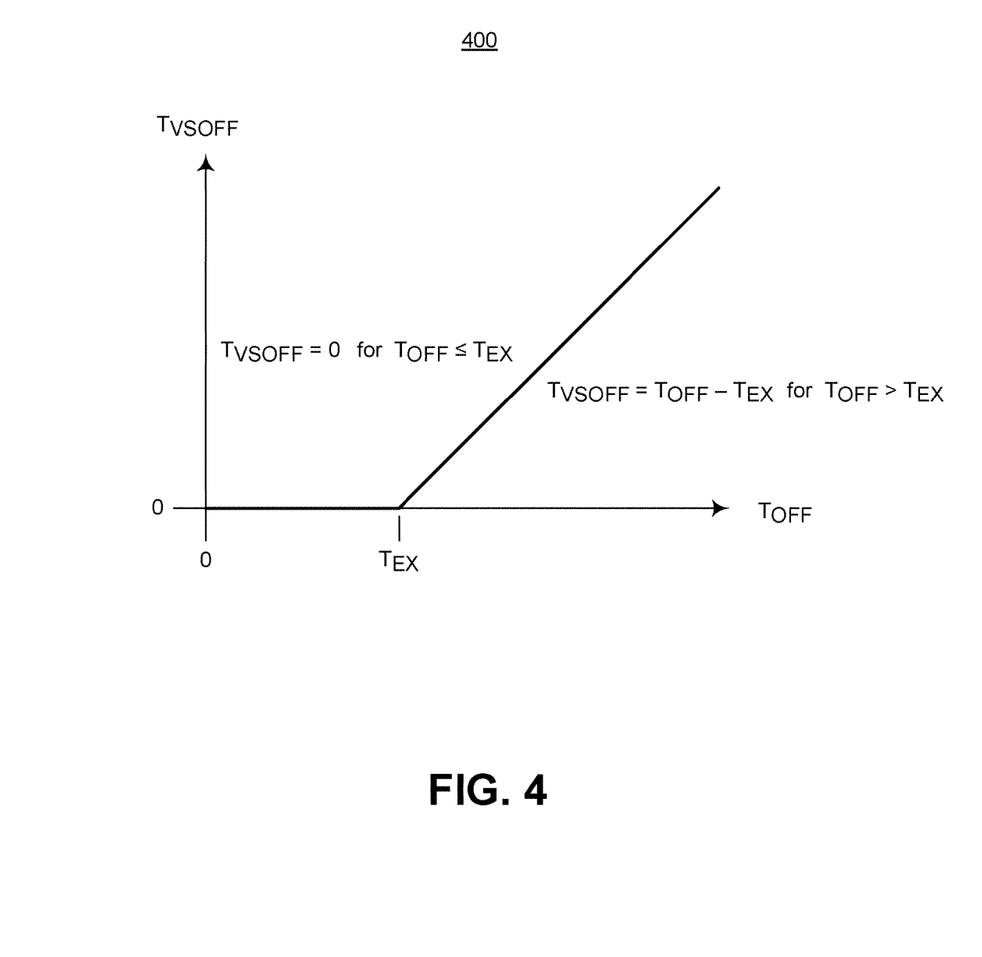
FIG. 4 is a graph showing an example relationship between the length of time that the input voltage is not being sensed and the length of time that the power switch is off in the example power converter of FIG. 1 in accordance with the teachings of the present invention.

FIG. 4 is a graph 400 that illustrates the relationships between off-time $T_{OFF}$, extended duration $T_{EX}$, and the duration of no line sensing $T_{VSOFF}$. The graph shows that the duration of no line sensing $T_{VSOFF}$ is zero when the off-time of switch SW1 146 is less than or equal to the extended duration $T_{EX}$. The graph also shows that the duration of no line sensing $T_{VSOFF}$ increases from zero with a constant slope when the off-time of switch SW1 146 is greater than the extended duration $T_{EX}$. In one example, the extended duration $T_{EX}$ is 50 microseconds because the off-time of switch SW1 146 at moderate loads in that example is also about 50 microseconds. In the same example, the off-time of switch SW1 146 at light loads (where there is a need to sense the input voltage with reduced power consumption) may be approximately 50 milliseconds, about 1000 times longer than the off-time at moderate loads.

Figure 5:
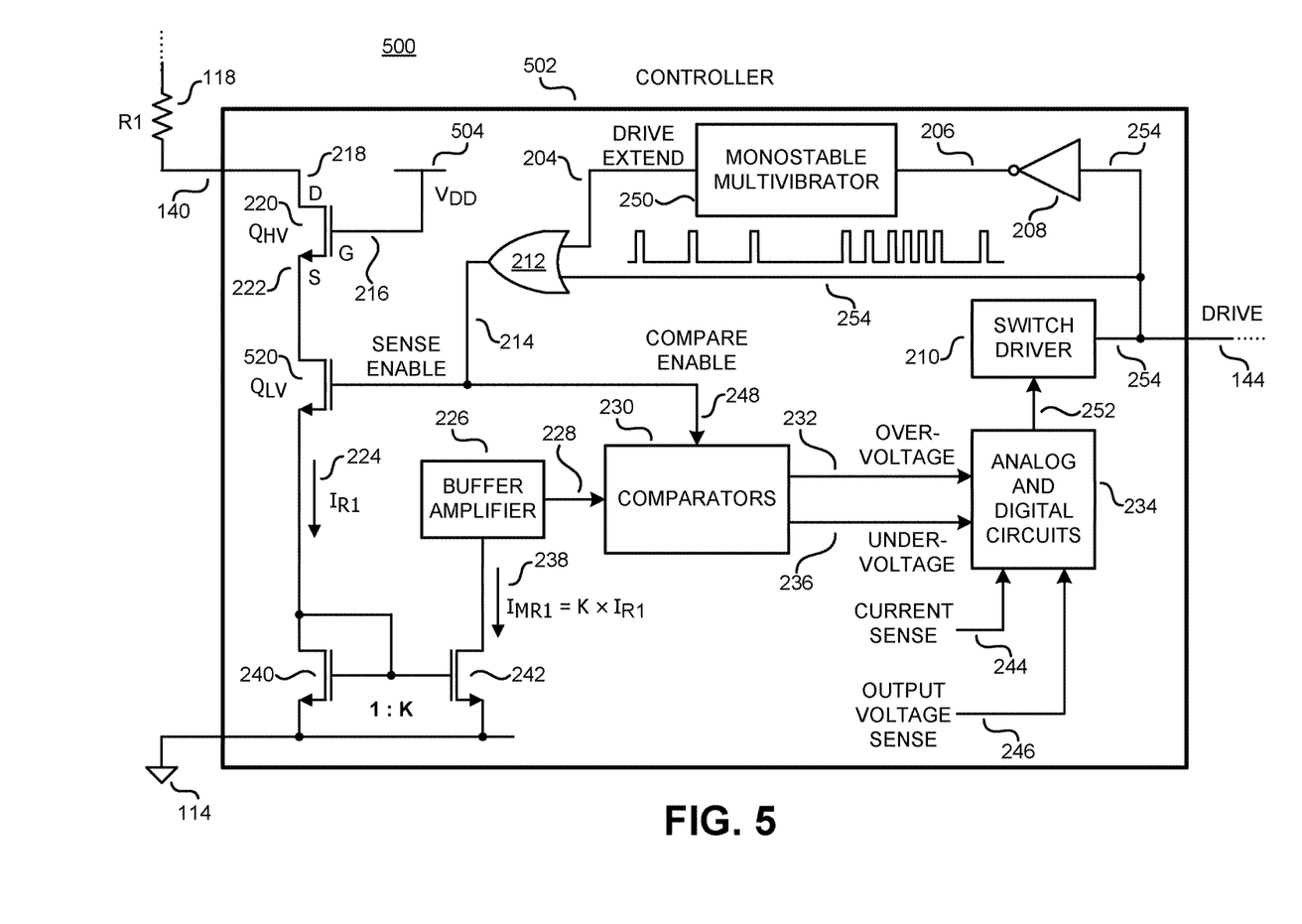
FIG. 5 is a functional block diagram of an example power converter controller illustrating elements of an alternative input voltage sensor in accordance with the teachings of the present invention.

FIG. 5 is a functional block diagram 500 of an example controller 502 for the power converter in FIG. 1 illustrating elements of an alternative input voltage sensor in accordance with the teachings of the present invention. FIG. 5 includes many of the elements illustrated in the example of FIG. 2.

In the alternative example of FIG. 5, the gate G 216 of high voltage transistor $Q_{HV}$ 220 is coupled to a regulated internal voltage $V_{DD}$ 504, and the source S 222 of high voltage transistor $Q_{HV}$ 220 is coupled to the drain of a low voltage transistor $Q_{LV}$ 520. In one example, the regulated internal voltage $V_{DD}$ 504 is approximately 5.8 volts. The source of low voltage transistor $Q_{LV}$ 520 is coupled to transistor 240 of the current mirror as in FIG. 2.

In the alternative example of FIG. 5, OR gate 212 produces a SENSE ENABLE signal 214 that is coupled to the gate of low voltage transistor $Q_{LV}$ 520 and is received by the comparators 230 at a COMPARE ENABLE input 248. When SENSE ENABLE signal 214 is a logic high level (approximately $V_{DD}$), low voltage transistor $Q_{LV}$ 520 turns ON enabling controller 502 to sense the input voltage as current $I_{R1}$ 224. When SENSE ENABLE signal 209 is a logic low level (approximately zero volts), low voltage transistor $Q_{LV}$ 520 turns OFF disabling controller 502 from sensing the input voltage and preventing controller 502 from receiving current from the input voltage in accordance with the teaching of the present invention.

Low voltage transistor $Q_{LV}$ 520 in the alternative example of FIG. 5 may be considered a line sense switch that closes to allow sensing of the input voltage to the power converter, and that opens to stop the sensing circuit from consuming power from the input voltage to the power converter.

Figure 6:
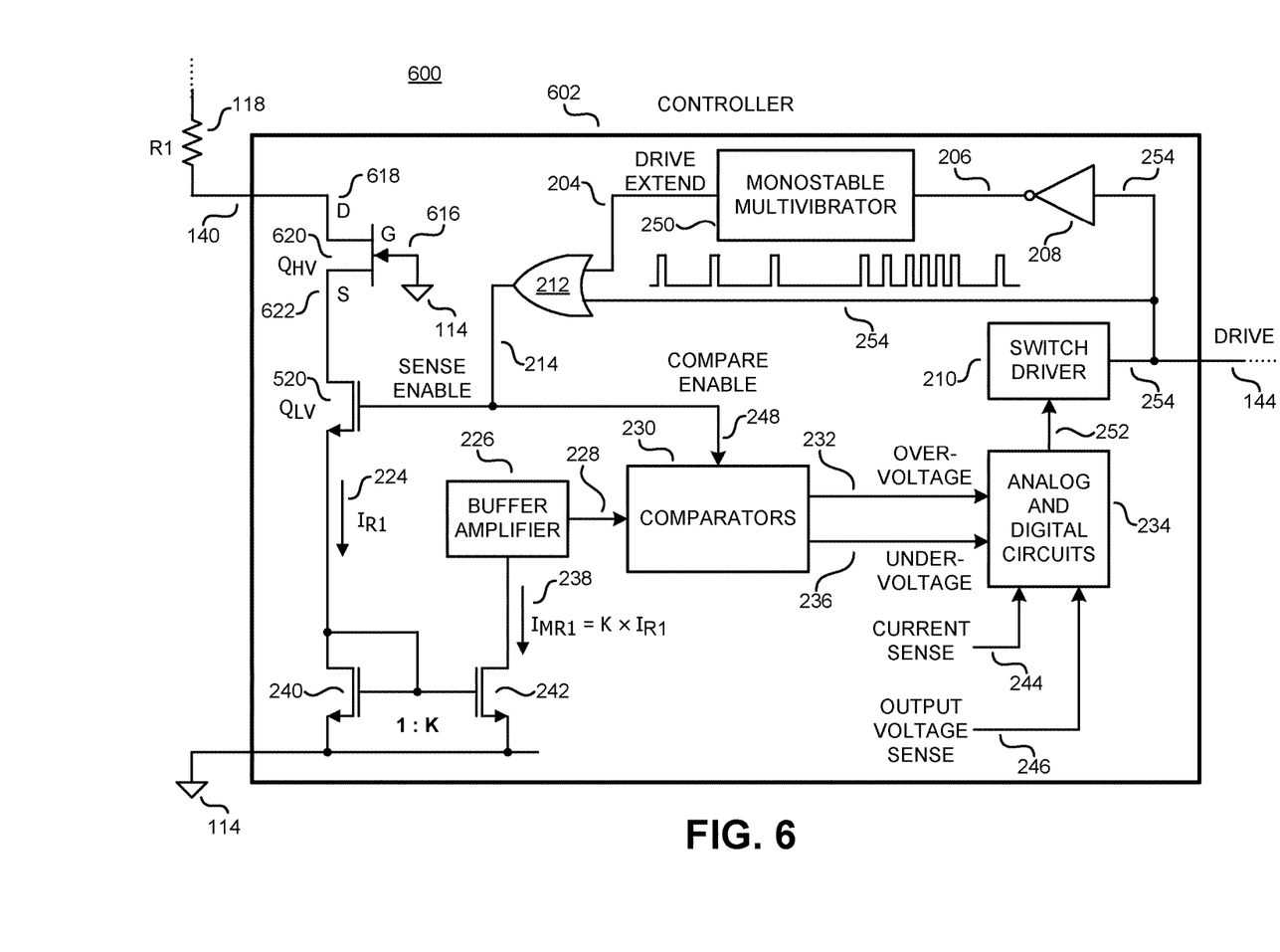
FIG. 6 is a functional block diagram of an example power converter controller illustrating elements of another alternative input voltage sensor in accordance with the teachings of the present invention.

FIG. 6 is a functional block diagram 600 of another example controller 602 for the example power converter in FIG. 1 illustrating elements of another alternative input voltage sensor in accordance with the teachings of the present invention. FIG. 6 includes many of the elements illustrated in the examples of FIG. 2 and FIG. 5.

The alternative example of FIG. 6 replaces the MOSFET that is high voltage transistor $Q_{HV}$ 220 in FIG. 5 with an n-channel junction field effect transistor (JFET) $Q_{HV}$ 620. Whereas the gate G 216 of the high voltage MOSFET $Q_{HV}$ 220 in FIG. 5 is coupled to the regulated internal voltage $V_{DD}$ 504, the gate G 616 of high voltage JFET $Q_{HV}$ 620 in FIG. 6 is coupled to the input return 114.

The drain D 618 of high voltage transistor $Q_{HV}$ 620 in the alternative example of FIG. 6 is coupled to the input voltage sense terminal 140, and the source S 622 of high voltage JFET $Q_{HV}$ 620 is coupled to low voltage transistor $Q_{LV}$ 520. As such, JFET $Q_{HV}$ 620 in the example of FIG. 6 performs the same function as MOSFET $Q_{HV}$ 220 in FIG. 5. JFET $Q_{HV}$ 620 in the example of FIG. 6 is ON when low voltage transistor $Q_{LV}$ 520 is ON and the input sense circuit is enabled to sense the input voltage, and JFET $Q_{HV}$ 620 in the example of FIG. 6 is OFF when low voltage transistor $Q_{LV}$ 520 is OFF and the input sense circuit is disabled from sensing the input voltage.

Figure 7:
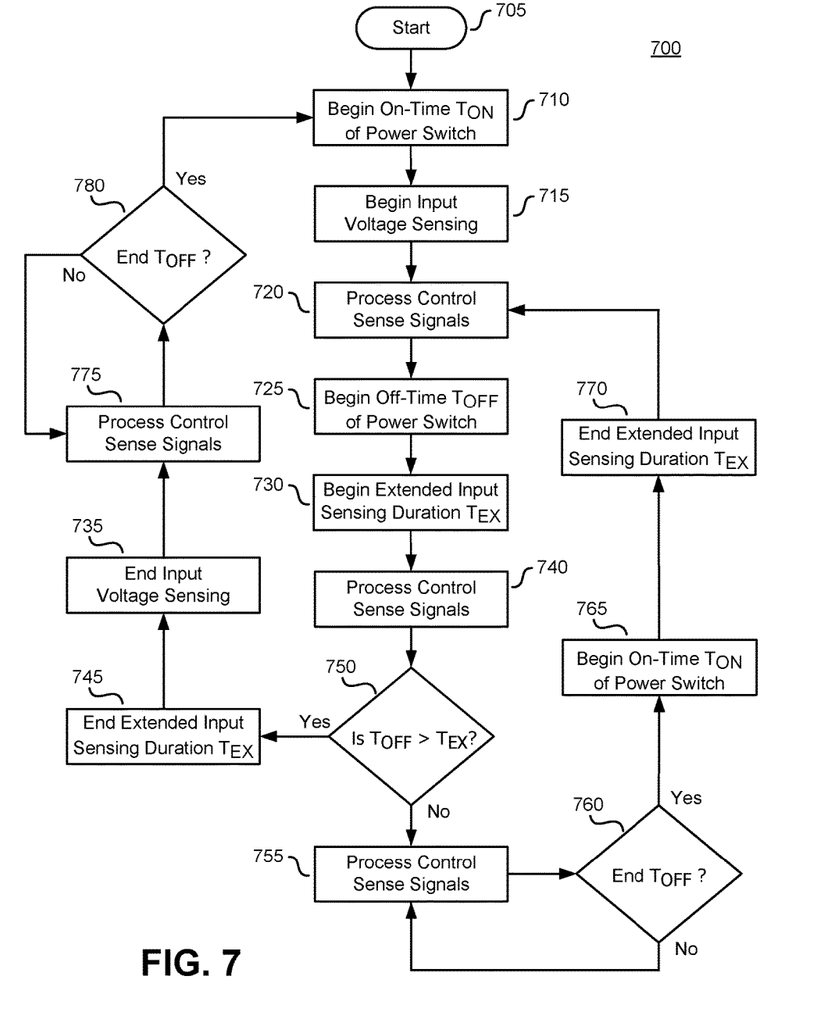
FIG. 7 is a flow diagram that illustrates an example process for sensing an input voltage in accordance with teachings of the present invention.

FIG. 7 is a flow diagram 700 that illustrates an example process for a power converter controller that senses an input voltage in accordance with the teachings of the present invention. The example flow diagram of FIG. 7 is consistent with the example controller of FIG. 2 and with the example waveforms of FIG. 3. After starting in block 705 with input voltage applied to the power converter and the controller has determined that the input voltage is within the proper limits for the converter to operate, the controller closes a power switch in block 710 to begin an on-time $T_{ON}$. The controller also closes a line sense switch in block 715 to begin input voltage sensing by allowing the controller to receive current at an input voltage sense terminal.

After the line sense switch closes in block 715, the controller processes control sense signals such as for example current sense, output sense, over-voltage sense, and under-voltage sense signals in block 720. When the processing calls for the power switch to turn OFF, the off-time $T_{OFF}$ of the power switch begins in block 725. The extended input voltage sensing duration $T_{EX}$ begins in block 730 when the power switch turns OFF.

The controller continues to process the control sense signals in block 740, while the off-time $T_{OFF}$ increases in decision block 750. If the off-time $T_{OFF}$ exceeds the extended input voltage sensing duration $T_{EX}$, then the extended input sensing duration $T_{EX}$ ends in block 745, the input voltage sensing ends in block 735, and the flow continues to blocks 775 and 780 where the controller processes the control sense signals until the controller ends the off-time and another on-time $T_{ON}$ begins in block 710. If the off-time $T_{OFF}$ does not exceed the extended input voltage sensing duration $T_{EX}$, then the flow continues to block 755. The off-time $T_{OFF}$ increases in blocks 755 and 760 until the controller ends the off-time and another on-time $T_{ON}$ begins in block 765, followed by the end of the extended input voltage sensing duration $T_{EX}$ in block 770. The processing of control sense signals continues in block 720.

Some applications of power converters require the input capacitor C1 106 to be large enough for the power converter to provide a regulated output to a heavy load for a time equivalent to several ac line periods after the ac input is removed. In these applications, when the load is very light or near zero load the dc input voltage $V_{BULK}$ 108 may require tens of seconds to decay below a minimum threshold value after the ac input voltage $V_{AC}$ 102 is removed. A power converter controller that must detect an input under-voltage condition within a few periods of the ac input voltage is therefore unable to do so reliably from only a measurement of the bulk voltage $V_{BULK}$ 108. For these applications, the controller may sense the ac input voltage as illustrated by the example of FIG. 8.

Figure 8:
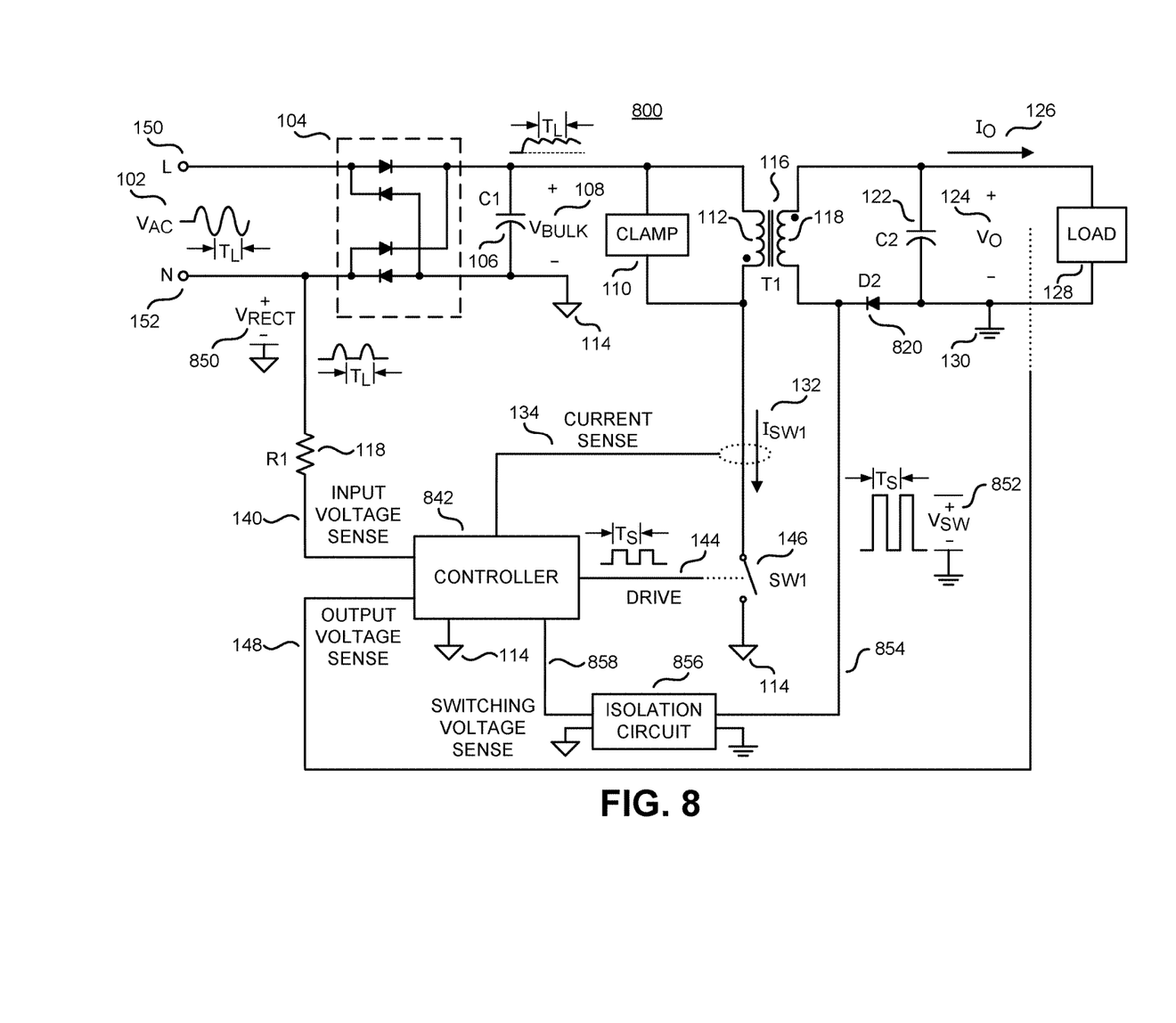
FIG. 8 is a schematic diagram of an example power converter including a controller that senses a switching voltage representative of a dc input voltage in addition to sensing an ac input voltage in accordance with the teachings of the present invention.

FIG. 8 is a schematic diagram 800 of an example power converter including a controller that senses a switching voltage $V_{SW}$ 852 that is representative of the dc input voltage $V_{BULK}$ 108 in addition to sensing the ac input voltage $V_{AC}$ 102 in accordance with the teachings of the present invention. In the example power converter of FIG. 8, one end of voltage sensing resistor R1 118 is coupled to neutral input terminal N 152 to receive a half-wave rectified voltage $V_{RECT}$ 850. In another example, one end of voltage sensing resistor R1 118 may be coupled to line input terminal L 150 to receive a half-wave rectified voltage $V_{RECT}$ 850.

Controller 842 in the example converter of FIG. 8 may sense the ac input voltage $V_{AC}$ 102 continuously when the load on the power converter is moderate to heavy, and it may sense the ac input voltage $V_{AC}$ 102 only during a fraction of a switching period when the load on the power converter is light according to the teaching of the present invention, in the same way that the converter of FIG. 1 senses the dc input voltage $V_{BULK}$ 108.

Circuits in controller 842 may respond to the absence of ac input voltage for more than one ac line period. Circuits in controller 842 may detect either an over-voltage condition or an under-voltage condition by sensing a switching voltage that is proportional to the bulk voltage $V_{BULK}$ 108.

A switching voltage $V_{SW}$ 852 that is proportional to the bulk voltage $V_{BULK}$ 108 is available at the output winding 118 of the example power converter of FIG. 8. Since the magnitude of the switching voltage $V_{SW}$ 852 is a substantially lower voltage than the peak of the ac input voltage $V_{AC}$ 102, the controller may sense the switching voltage $V_{SW}$ 852 with significantly lower power consumption than would be required to sense the higher voltage $V_{BULK}$ 108.

The example power converter of FIG. 8 is obtained from the example of FIG. 1 by relocating output diode D1 120 of FIG. 1 to the position of output diode D2 820 of FIG. 8, and by receiving the switching voltage $V_{SW}$ 852 with a modified controller 842. An isolation circuit 856 provides galvanic isolation between the input return 114 and the output return 130 such that the switching voltage sense signal 858 is galvanically isolated from the switching voltage signal 854.

In one example, isolation circuit 856 may be an optocoupler. In another example, isolation circuit 856 may include a transformer. With the modifications illustrated in FIG. 8, the modified controller 846 may detect an input over-voltage condition even when the controller is not receiving current from the ac input voltage $V_{AC}$ 102. It is appreciated that in other examples, a switching voltage signal analogous to switching voltage $V_{SW}$ 852 could be obtained from a separate winding other than the output winding 118 shown in FIG. 8 while still benefiting from the teachings of the present invention.

Figure 9:
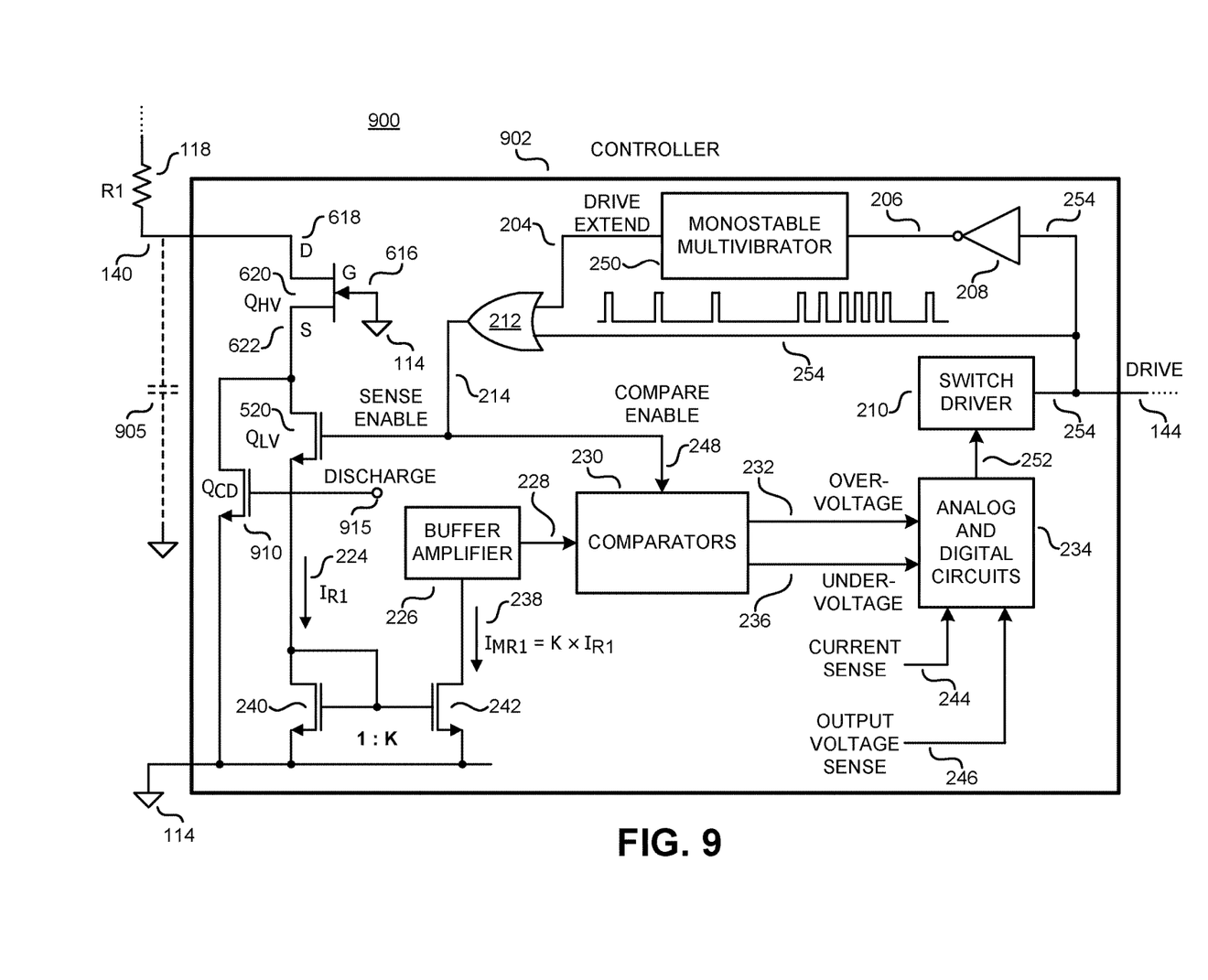
FIG. 9 is a schematic diagram of an example power converter controller illustrating elements of an input voltage sensor that includes an optional element to discharge stray capacitance in accordance with the teachings of the present invention.

Every conductor in an electrical circuit has a finite parasitic capacitance that may store an electric charge. Leakage currents in typical applications usually discharge the parasitic capacitance fast enough to make the effects of the parasitic capacitance negligible. In applications where the effects of parasitic capacitance are not negligible, relatively small modifications to the example circuits may allow those applications to benefit from the ac voltage sensor with low power consumption in accordance with the teachings of the present invention. FIG. 9 is a schematic diagram 900 of an example power converter controller 902 illustrating elements of an input voltage sensor that includes an optional element to discharge stray capacitance at an input voltage sense terminal in accordance with the teachings of the present invention.

The example controller of FIG. 9 includes many of the elements illustrated in the example of FIG. 6. Parasitic capacitance 905 between input voltage sense terminal 140 and input return 114 may charge to the input voltage when high voltage transistor $Q_{HV}$ 620 is not conducting. The discharge of parasitic capacitance 905 through low voltage transistor $Q_{LV}$ 520 might produce a high value for current $I_{R1}$ 224 that would indicate a false high input voltage to the controller. To prevent false indications of high input voltage, the parasitic capacitance 905 may be discharged through a path that does not put the current from the discharge of the capacitance through transistor 240 of the current mirror formed by transistors 240 and 242. In the example of FIG. 9, the stray capacitance 905 is discharged through transistor $Q_{CD}$ 910 in response to a DISCHARGE signal 915. In one example, circuits in the controller (not shown in FIG. 9) raise DISCHARGE signal 915 to a high logic level for about 200 nanoseconds to discharge stray capacitance 905 immediately before DRIVE signal 254 goes high.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. An ac-dc power converter controller, comprising:
   a switch driver circuit coupled to generate a drive signal to control switching of a power switch to control a transfer of energy from an input of the power converter to an output of the power converter;
   an input sense circuit coupled to receive an input sense signal representative of the input of a power converter, wherein the input sense circuit is a current input sense circuit, and wherein the input sense signal representative of the input of the power converter is a current, wherein input sense circuit comprises a high voltage transistor coupled to receive the input sense signal; and
   a sense enable circuit coupled to generate a sense enable signal in response to the drive signal, wherein the sense enable signal is coupled to control the input sense circuit to sense the input sense signal for an extended duration of time after the power switch turns OFF.

2. The ac-dc power converter controller of claim 1 wherein the input sense circuit is disabled from sensing the input sense signal when a period of an OFF time of the power switch is greater than the extended duration of time.

3. The ac-dc power converter controller of claim 1 wherein the input sense circuit further comprises a low voltage transistor coupled to the high voltage transistor, wherein the low voltage transistor is coupled to be switched in response to the sense enable signal.

4. The ac-dc power converter controller of claim 1 further comprising a comparator circuit coupled to the input sense circuit and the sense enable circuit, wherein the comparator is coupled to detect if the input of the power converter is greater or less than one or more thresholds.

5. The ac-dc power converter controller of claim 4 wherein the one or more thresholds include one or more of an under-voltage threshold and an over-voltage threshold.

6. The ac-dc power converter controller of claim 1 wherein the high voltage transistor is coupled to be switched in response to the sense enable signal.

7. The ac-dc power converter controller of claim 1 wherein the input sense circuit comprises a current mirror circuit coupled to receive the input sense signal representative of the input of the power converter, wherein the current mirror circuit is coupled to generate a scaled representation of the input sense signal.

8. The ac-dc power converter controller of claim 7 wherein the input sense circuit further comprises a buffer amplifier circuit coupled to the current mirror circuit, wherein the buffer amplifier circuit is coupled to output the scaled representation of the input sense signal.

9. The ac-dc power converter controller of claim 1 wherein the sense enable circuit comprises a monostable multivibrator coupled to generate a drive extend signal in response to the drive signal, wherein the sense enable circuit is further coupled to generate the sense enable signal to control the input sense circuit in response to the drive extend signal.

10. The ac-dc power converter controller of claim 9 wherein the sense enable circuit further comprises an OR gate coupled to generate the sense enable signal in response to the drive signal and drive extend signal.

11. A power converter, comprising:
    an input winding coupled to receive an input of the power converter;
    an output winding coupled to deliver an output to a load coupled to an output of the power converter;
    a power switch coupled to the input winding of the power converter;
    an isolation circuit coupled to provide galvanic isolation and coupled to sense a switching voltage; and
    a power converter controller coupled to the isolation circuit, wherein the power converter controller is further coupled to generate a drive signal coupled to control switching of the power switch to control a transfer of energy from the input of the power converter to the output of the power converter in response to a feedback signal representative of the output of the power converter, wherein the power converter controller includes:
    a switch driver circuit coupled to generate the drive signal to control switching of the power switch to control the transfer of energy from the input of the power converter to the output of the power converter;
    an input sense circuit to receive an input sense signal representative of the input of a power converter, wherein the input sense circuit is a current input sense circuit, and wherein the input sense signal representative of the input of the power converter is a current, wherein input sense circuit comprises a high voltage transistor coupled to receive input sense signal; and
    a sense enable circuit coupled to generate a sense enable signal in response to the drive signal, wherein the sense enable signal is coupled to control the input sense circuit to sense the input sense signal for an extended duration of time after the power switch turns OFF.

12. The power converter of claim 11 wherein the isolation circuit further comprises an optocoupler.

13. The power converter of claim 11 wherein the isolation circuit further comprises a transformer.

14. The power converter of claim 11 wherein the power converter controller is coupled to receive a current sense signal representative of a current through the power switch, wherein the power converter controller is further coupled to generate the drive signal coupled to control switching of the power switch to control the transfer of energy from the input of the power converter to the output of the power converter in response to current sense signal.

15. The power converter of claim 11 wherein the power converter controller further includes a comparator circuit coupled to the input sense circuit and the sense enable circuit, wherein the comparator is coupled to detect if the input of the power converter is greater or less than one or more thresholds.

16. The power converter of claim 15 wherein the one or more thresholds include one or more of an under-voltage threshold and an over-voltage threshold.

17. The power converter of claim 11 wherein input sense circuit further comprises a low voltage transistor coupled to the high voltage transistor, wherein the low voltage transistor is coupled to be switched in response to the sense enable signal.

18. The power converter of claim 11 wherein the high voltage transistor is coupled to be switched in response to the sense enable signal.

19. The power converter of claim 11 wherein the input sense circuit comprises a current mirror circuit coupled to receive the input sense signal representative of the input of the power converter, wherein the current mirror circuit is coupled to generate a scaled representation of the input sense signal.

20. The power converter of claim 19 wherein the input sense circuit further comprises a buffer amplifier circuit coupled to the current mirror circuit, wherein the buffer amplifier circuit is coupled to output the scaled representation of the input sense signal.

21. The power converter of claim 11 wherein the sense enable circuit comprises a monostable multivibrator coupled to generate a drive extend signal in response to the drive signal, wherein the sense enable circuit is further coupled to generate the sense enable signal to control the input sense circuit in response to the drive extend signal.

22. The power converter of claim 21 wherein the sense enable circuit further comprises an OR gate coupled to generate the sense enable signal in response to the drive signal and drive extend signal.

23. The power converter of claim 11 wherein the input sense circuit is disabled from sensing the input sense signal when a period of an OFF time of the power switch is greater than the extended duration of time.

24. The power converter of claim 11 wherein the output to the load is a voltage.

* * * * *